United States Patent Office 3,311,567
Patented Mar. 28, 1967

3,311,567
CORROSION INHIBITOR COMPOSITION CONTAINING RESIN ALIAMIDE
Olen L. Riggs, Jr., Ponca City, Okla., assignor to Continental Oil Company, Ponca City, Okla., a corporation of Delaware
No Drawing. Filed Jan. 20, 1964, Ser. No. 338,582
9 Claims. (Cl. 252—390)

This invention relates to a composition for inhibiting corrosion of metal surfaces, particularly iron and steel.

The corrosion metals, and especially iron and steel, due to atmospheric corrosion is a serious problem. This problem is aggravated in regions subject to industrial fumes discharged to the atmosphere and those near salt water.

Many inhibitors have been developed to reduce this corrosion. Stabilized rosin amines and their fatty acid salts when coated on metal surfaces are relatively effective inhibitors (U.S. Patent No. 2,484,010). A combination of stabilized rosin amine-fatty acid salts and oil soluble metal sulfonates is effective (U.S. Patent 2,840,477).

For protection of hand tools, firearms, machined parts and stored inactive machinery, it is desirable to use a composition which does not place an unctuous film on the surface and also that the film be easy to remove by washing with a volatile hydrocarbon. A volatile hydrocarbon, such as naphtha, is used as solvent (carrier) for corrosion inhibitors intended for this purpose. It has been observed that the stablized rosin amine-fatty acid salts are essentially insoluble in naphtha, at least in the presence of oil soluble metal sulfonates. Such a composition must be stirred before the coating is applied to obtain a dispersion of the amine salt in the naphtha. Even with precautions there results non-uniform coatings which permit spot corrosion.

It has been discovered that a completely oil soluble corrosion inhibitor system is represented by: an amide derived from a salt of a stabilized rosin amine and a fatty acid having 8–24 carbon atoms. The preferred corrosion inhibitor composition of the invention includes the above amide, an oil soluble metal sulfonate having a molecular weight of about 300–700, and an oil carrier therefor.

The amide component of the corrosion inhibitor of the invention is a stablized rosin aliamide (aliphatic amide) where the aliphatic hydrocarbon portion has 7–23 carbon atoms, preferably 13–23 carbon atoms. Or in other words, R—CONH—R' where R is the aforesaid aliphatic hydrocarbon group and R' is a stabilized rosin nucleus. The amide may be derived from salt of a stabilized rosin amine and a fatty acid having 8–24 carbon atoms. Preferred amides are stabilized rosin stearamide and stabilized rosin oleamide.

The rosin amine reactant may be prepared from dehydrongenated rosin, disproportionated rosin or hydrogenated rosin by first reacting with ammonia to form the nitrile and then hydrogenating the nitrile to the amine. The step of making the nitrile may be carried out by passing gaseous ammonia into the molten rosin material and vaporizing the water as fast as it is formed or by heating the rosin material and ammonia in the presence of a dehydration catalyst. The nitrile is preferably purified by alkali extraction or by distillation to remove unconverted acids prior to hydrogenation to the amine, since the acidic materials frequently destroy the activity of the hydrogenation catalyst. The hydrogenation of the nitrile may me carried out in the presence or absence of a solvent and in the presence or absence of ammonia. The catalyst may be any of the well-known hydrogenation catalysts such as Raney nickel, Raney cobalt, activated nickel, cobalt, palladium or platinum, etc., and supports may be used if desired. The hydrogenation is usually carried out under a pressure of about 200 to about 8,000 pounds per square inch at a temperature of about 20° C. to about 200° C.

By the term "stabilized rosin amine" is meant a rosin amine having the ring structure of a stabilized rosin acid such as dehydroabietic acid, dihydroabietic acid, or tetrahydroabietic acid or a mixture of such rosin amines. The term "disproportionated rosin amine" is intended to cover a mixture which is chiefly dehydro-and dihydrorosin amines.

A preferred stabilized rosin amine reactant is Rosin Amine D, Rosin Amine D is a primary amine obtained from a special grade of modified rosin. It is insoluble in water but soluble in many organic solvents and generally contains about 88–90% of resin amine, the impurities being the normal non-acid constituents of refined wood rosin and small amounts of saturated oils resulting from decarboxylation of resin acids. Typical analysis and physical properties of this product are as follows:

| | |
|---|---|
| Physical state | Viscous yellow liquid. |
| Color | Pale yellow. |
| Density at 25° C | 0.997. |
| Refractive index at 20° C. | 1.5410. |
| Nitrogen content | 4.2–4.5%. |
| Bromine number (DBr-KBrO₃) | 49. |
| Viscosity at 25° C. | 4670 centistokes. |
| Boiling range (5 mm.) | 187–211° C. |
| Boiling range (100 mm.) | 270–291° C. |
| Boiling range (760 mm.) | 344° C. (partial decomposition). |
| Flash point (Cleveland open cup) | 192° C. |
| Heat of vaporization | 20,100 calories per mole. |
| Neutralization equivalent | 317. |

Pure Rosin Amine D is thought to have the configuration:

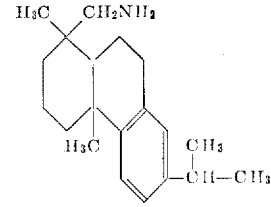

The fatty acid reactant has 8–24 carbon atoms; it may be saturated or unsaturated. Illustrative acids are: caprylic, capric, lauric, myristic, palmitic, stearic, behemic, lignoceric, oleic, linoleic, eleostearic, and erucic. Mixtures of these may be used such as palm oil and coconut oil.

In a convenient method of preparing the amide, the rosin amine and fatty acid are reacted to form the corresponding salt. The salt is converted to the corresponding amide by heating at an elevated temperature until the conversion is complete. A typical procedure is: Weigh into a standard three-neck round bottom flask, one gram-molecular-weight of Rosin Amine D Stearate. Vent one outlet to the atmosphere. Insert centigrade scale thermometer in another outlet. The next outlet is used for a stirrer. Raise the temperature to 189° C. (372° F.) and hold at this level for sixty minutes. Allow resultant compound to cool. Its physical appearance is no longer the waxy crystal but is now a deep amber viscous fluid. The Rosin Amine D Stearate has been converted to Rosin D Stearamide. The stearamide is very soluble in petroleum naphtha.

Although the amide used in the composition of the invention has been described as the conversion product of a salt of rosin amine and a fatty acid, it is to be understood the invention is not limited to amides from this particular exemplary source.

The oil-soluble metal sulfonate component may be derived from either a hydrocarbon sulfonic acid, i.e., one wherein the nucleus is composed only of carbon and hydrogen, or one which includes substituents as halogen, oxygen, or sulfur which do not change the essential nature of the sulfo ($-SO_3H$) group. It is preferred to use the hydrocarbon sulfonic acids.

Suitable oil-soluble hydrocarbon sulfonic acids include alkane sulfonic acid, aromatic sulfonic acid, alkaryl sulfonic acid, aralkyl sulfonic acid, and the "natural" petroleum mahogany sulfonic acids. The mahogany sulfonic acids include any of those materials which may be obtained by concentrated or fuming sulfuric acid treatment of petroleum fractions, particularly the higher boiling cycle oils, lubricating oil distillates, white oil distillates and solvent extracts. The higher molecular weight petroleum oil-soluble mahogany sulfonic acids are condensed-ring compounds which condensed-rings may be aromatic or hydroaromatic in nature. Alkyl and/or cycloalkyl substituents may be present in the mahogany sulfonic acids.

Illustrative of one class of suitable hydrocarbon nuclei are the materials made by reaction of a benzene hydrocarbon with a "wax hydrocarbon." Hydrocarbons are derived from paraffin wax having an average carbon atom content of 18 to 24 or even more. Normally two of the wax hydrocarbon side-chains are present in the final product and these compounds are spoken of as diwaxbenzenes.

The term "aromatic hydrocarbon" is intended to include those hydrocarbons containing a benzene-ring or a number of condensed benzene-rings; for example, benzene naphthalene and anthracene. Alkyl and/or cycloalkyl side-chains may be present. The term "benzene hydrocarbon" is intended to include all operative hydrocarbons containing a single benzene-ring and includes benzene itself. Particularly preferred members of this class are benzene, toluene, ethylbenzene and the xylenes.

An especially suitable hydrocarbon nucleus is afforded by the reaction product of a highly branched olefin with an aromatic hydrocarbon, in general, and a benzene hydrocarbon in particular; the products being alkylaromatic or alkylbenzene respectively. These highly branched olefins are available from the petroleum industry through polymerization of propylene and/or butylene. In the case of the low molecular weight butylene polymers, the polymer normally contains 2 to 6 units. In the case of the low molecular weight propylene polymers, the polymer normally contains 2 to 8 units.

The especially preferred alkylaromatic hydrocarbons are normally prepared by reacting the olefin with the aromatic hydrocarbon in the presence of a Friedel-Crafts type catalyst, usually aluminum chloride.

The most preferred hydrocarbon nucleus for the preparation of the sulfonic acid used in the process of the invention is obtained from the reaction product of propylene tetramer with benzene, using aluminum chloride catalyst. The reaction product contains a very wide range of alkylbenzenes both in number of alyl groups present and in the number of carbon atoms present in each alkyl group. A particular fraction of the reaction product is the most preferred hydrocarbon nucleus for the subsequent sulfonation reaction. This preferred alkylbenzene nucleus is given the name "postdodecylbenzene" and includes as the alkylbenzene components monododecylbenzene and didodecylbenzene in the approximate molar ratio of 2:3.

Typical characteristics of postdodecylbenzene are:

| | |
|---|---|
| Specific gravity at 38° C. | 0.8649 |
| Average molecular weight | 385 |
| Percent sulfonatable | 88 |
| ASTM (D-158 Engler) ° F.: | |
| I.B.P. | 342 |
| 5% | 361 |
| 50% | 379 |
| 90% | 404 |
| 95% | 413 |
| F.B.P. | 415 |
| Refractive index at 23° C. | 1.4900 |
| Viscosity at (° C.): | |
| −10 centipoises | 2800 |
| 20 do | 280 |
| 40 do | 78 |
| 80 do | 18 |
| Aniline point, ° C. | 69 |
| Pour point, ° C. | −32 |

Especially preferred are the alkylbenzene hydrocarbons having 12–30 alkyl carbon atoms. The lower molecular weight benzene hydrocarbons as defined earlier are preferred for the benzene portion of the alkylbenzene hydrocarbon. As was pointed out above especially suitable sulfonic acid is produced from postdodecylbenzene.

The corresponding hydrocarbon sulfonic acid is usually prepared by treating the hydrocarbon with concentrated sulfuric acid, fuming sulfuric acid or sulfur trioxide. The sulfonation of hydrocarbons is well known and details need not be given.

The defined sulfonic acids are converted to the metal sulfonates by reaction with the desired metal, in the form of a basic compound, which will afford an oil soluble sulfonate. Illustrative metals are: lithium, potassium, sodium, calcium, magnesium, iron, cobalt, nickel, barium, chromium, copper, manganese and lead. The alkali metals and alkaline earth metals are preferred.

The oil soluble metal sulfonate used in the composition of the invention has a molecular weight of about 300–700 and, more commonly, of about 425–650.

The oil carrier may be hydrocarbon, vegetable oil or animal oil, such as fish oil. The oil may be a drying oil such as linseed oil, semi-drying such as soya oil, or non-drying such as saturated hydrocarbons. For light duty it is desirable to use a normally liquid hydrocarbon carrier; this may be paraffin, cyclo paraffin, aromatic or mixtures thereof. Preferably, a volatile hydrocarbon which evaporates at ordinary atmosphere conditions is used as the carrier; these are normally liquid hydrocarbons boiling below about 450° F. such as varnish makers naphtha, hexane, benzene cyclohexane, light petroleum naphtha boiling below about 325° F., and heavy naphtha boiling below 450° F.; an unleaded gasoline is suitable.

The composition of the invention includes the defined amide and the defined sulfonate in proportions needed to give corrosion protection for the particular material and the particular corrosion situation. Commonly, the amide is present in an active amount of about 0.1–5 weight perecnt based on composition. Also commonly, the sulfonate is present in an active amount of about 1–10 weight percent based on composition. In special situations other materials which impart additional properties may be present.

In the case of the compositions including carrier hydrocarbons boiling below about 450° F., there may be present higher boiling hydrocarbons in a minor amount, usually less than about 10% on the compositions. It is customary to produce and sell the sulfonates as concentrates containing about 25–70% of the sulfonate and the remainder a lubricating oil (mineral oil) or higher boiling aromatic oil. The amide itself is normally not a pure compound and these impurities will be present in the composition. Also it is common to dilute the amide with a mineral oil to make it easier to handle and to blend into the carrier. Thus the volatile hydrocarbon is generally only essentially the remainder of the composition—after spelling out the active amounts of amide and sulfonate.

A preferred composition consists of: stabilized rosin stearamide or oleamide, in an amount of about 0.5–2 weight percent based on composition; oil soluble metal benzene sulfonate having about 12–30 alkyl carbon atoms where the metal is either alkali metal or alkaline earth metal, in an amount of about 2–5 weight percent based on composition; and the remainder is essentially a normally liquid hydrocarbon having a boiling point below about 450° F., and more usually below about 325° F.

A typical composition of the invention is: Rosin D Stearamide solution 1% by weight (65% active material; 35% low viscosity mineral oil); calcium postdodecyl sulfonate solution (30% active material; 70% low viscosity mineral oil); and the remainder light petroleum naphtha.

The compositions of this invention may be used for the protection of any metal surfaces which corrode on exposure to moisture and corrosive acids in the atmosphere, or the metal surfaces of internal combustion engines, cylinders of steam engines, articles of manufacture such as nails, screws and other hardware, tools, instruments, implements, farm equipment such as plows, mowers, etc. The compositions are most effective on iron or steel surfaces.

ILLUSTRATIONS

The effectiveness of corrosion inhibitor compositions was determined by suspending inhibitor coated, and blank, coupons above splashing salt water. This system is much more corrosive than ordinary atmospheric exposure conditions. It is comparable to the splash zone, the most corrosive zone, in offshore ocean service.

The test apparatus consisted of a glass jar 12 inches in diameter by 12 inches tall. A horizontal circular plate provided with notches to hold test coupons was suspended in and near the top of the jar; this plate was revolved at 5 r.p.m. by an electric motor. The jar contained about a 3-inch depth of 5% sodium chloride solution. A glass air inlet tube released an air stream near the bottom of the solution at about the radial center of the jar. The air rate was high enough to cause splashing of the salt water onto the coupons.

The coupons were made of 1020 carbon steel, measured 1 x 8 inches, and weighed about 75 grams. All the coupons were abraded to 80 grit bright surfaces and then weighed. The test coupons were sprayed with the corrosion inhibitor composition. At the end of a desired test period, the coupons were removed and weighed. Before weighing they were scrubbed and descaled in an inhibited hydrochloric acid bath. The weight loss difference between the blank and the treated coupons was determined. The inhibitor effectiveness was determined by substituting the determined weight losses in the following equation:

$$\text{Percent protection} = \frac{(W_1 - W_2)100}{W_1}$$

$W_1$ = Weight of untreated coupon
$W_2$ = Weight of treated coupon

Data from duplicate runs were reproducible to about 2 percent. The reproducibility of well protected, little corroded coupons was greater than that of the blanks. The blanks were all badly corroded.

Example I

The corrosion inhibitor composition used in this example was:

| | Wt. percent |
|---|---|
| Calcium postdodecylbenzene sulfonate | 3.0 |
| Rosin D stearamide | 0.65 |
| Light naphtha (325° F. Endpoint) | 89.0 |
| Mineral oil [1] | 7.35 |

[1] Present as solvent in the sulfonate and amide solutions used as the sources of the materials.

Repeated tests show that after 30 days' exposure, a consistent 94% protection was afforded by a coating of composition. This corresponds to about six months' protection (under normal dry atmospheric conditions).

Example II

A short 5-day test was used to evaluate metals sulfonate; this duration is sufficient to determine significant differences. The test composition included: the test sulfonate 1.7 weight percent; Rosin D stearamide, 0.3 weight percent; light naphtha; and mineral oil, about 7%, from the sulfonate and amide solutions. In all cases, the sulfonic acid was postdodecyl benzene sulfonic acid. Representative results are set out below.

| Type: | Percent protection |
|---|---|
| Calcium | 98 |
| Sodium | 98 |
| Lithium | 95 |
| Barium | 95 |
| Potassium | 94 |
| Magnesium | 94 |
| Ammonium | 57 |

Example III

Various carriers were tested in a 20-day duration series of tests. The test composition included: calcium postdodecyl benzene sulfonate, 1.7 weight percent (as a 30% solution in mineral oil); Rosin D stearamide, 0.3 weight percent (as a 65% solution in mineral oil); mineral oil, 4.1%; carrier, the remainder. The results of these tests are set out below.

| Carrier: | Percent protection |
|---|---|
| Fish oil | 83 |
| Rice oil | 83 |
| Naphtha | 94 |
| PDO–40 [1] | 98 |
| HF alkylation oil [2] | 98 |

[1] Hydrocarbon drying oil.
[2] Hydrocarbon drying oil recovered from the regenerator tower of an HF alkylation unit.

Example IV

Sulfonic acids were prepared from the extracts obtained in Furfural extraction of a lubricating oil distillate. These sulfonic acids were converted to barium, calcium and lithium sulfonates respectively. The molecular weights of these were in the range of 562–672.

In 30-day duration tests, the following compositions:

| | wt. percent |
|---|---|
| Barium or calcium sulfonate | 3.0 |
| Rosin D stearamide | 0.65 |
| Mineral oil | 7.35 |
| Light naphtha | 89.0 | provided percent protection of 100% for the calcium containing composition and 95% for the barium containing composition.

The above formulation adjusted to 5% lithium sulfonate content gave 94% protection in the 30-day test.

Example V

The defined Rosin amides are soluble in the naphtha carrier compositions to a degree in excess of the maximum desriable amount for corrosion inhibitor usage.

However, at 75° F. it was observed that Rosin amine D stearate was essentially not soluble. At 100° F. only a slight amount was soluble; on cooling to 75° F., this slight amount precipitated out of solution.

Thus having described the invention, what is claimed is:

1. A corrosion inhibitor solution composition consisting essentially of:

(a) an amide corresponding to the formula

R—CONH—R′ where R is an aliphatic hydrocarbon radical having from 7 to 23 carbon atoms and R' is a stabilized rosin nucleus, said amide being present in an amount of about 0.1–5 weight percent, (b) an oil soluble metal sulfonate selected from the group consisting of alkali metal alkyl sulfonate, alkaline earth metal alkyl sulfonate, alkali metal alkyl benzene sulfonate and alkaline earth metal alkyl benzene sulfonate, said sulfonate having a molecular weight of about 300–700 and being present in an amount of about 1–10 weight percent, and (c) the remainder an oil carrier for said amide and said sulfonate, said carrier being selected from the class consisting of hydrocarbon oil, vegetable oil and animal oil.

2. The composition of claim 1 wherein said sulfonate is alkali metal or alkaline earth metal alkylbenzene sulfonate having about 12 to 30 alkyl carbon atoms.

3. The composition of claim 1 wherein said oil carrier is naphtha.

4. The composition of claim 1 wherein said amide is stabilized rosin stearamide.

5. The composition of claim 1 wherein said amide is stabilized rosin oleamide.

6. A corrosion inhibitor solution composition consisting of: stabilized rosin aliamide where the aliphatic portion has 13–23 carbon atoms, in an amount of about 0.5–2 weight percent, based on composition; an oil soluble metal sulfonate selected from the group consisting of alkali metal alkyl sulfonate, alkaline earth metal alkyl sulfonate, alkali metal alkyl benzene sulfonate and alkaline earth metal alkyl benzene sulfonate having about 12 to 30 alkyl carbon atoms, said sulfonate having a molecular weight of about 425–650 in an amount of about 2–5 weight percent, based on composition; and the remainder essentially an oil carrier for said amide and said sulfonate, said carrier being selected from the class consisting of hydrocarbon oil, vegetable oil and animal oil having a boiling point below about 450° F.

7. The composition of claim 6 wherein the stabilized rosin aliamide is stabilized rosin stearamide.

8. The composition of claim 6 wherein said sulfonate is calcium postdodecylbenzene sulfonate.

9. The composition of claim 8 wherein said oil carrier is a light petroleum naphtha.

References Cited by the Examiner
UNITED STATES PATENTS

| | | | |
|---|---|---|---|
| 2,848,010 | 10/1949 | Bried | 106—14 |
| 2,629,693 | 2/1953 | Barton et al. | 252—390 X |
| 2,632,694 | 3/1953 | Watkins. | |
| 2,808,376 | 10/1957 | Lowe. | |
| 2,828,259 | 3/1958 | Wirtel et al. | |
| 2,840,477 | 6/1958 | Shock et al. | 106—239 X |
| 2,850,461 | 9/1958 | Block et al. | 252—394 X |

OTHER REFERENCES

Hercules "Rosin Amine D and its Derivatives," Hercules Powder Co., Wilmington, Del., 1950, p. 2 relied on.

ALBERT T. MEYERS, *Primary Examiner.*

LEON D. ROSDOL, SAMUEL H. BLECH,
*Examiners.*

M. WEINBLATT, *Assistant Examiner.*

UNITED STATES PATENT OFFICE
CERTIFICATE OF CORRECTION

Patent No. 3,311,567                                            March 28, 1967

Olen L. Riggs, Jr.

It is hereby certified that error appears in the above numbered patent requiring correction and that the said Letters Patent should read as corrected below.

Column 1, line 12, after "corrosion" insert -- metals --; column 2, line 17, for "88-90%" read -- 88-95% --; line 57, for "hemic" read -- henic --; column 3, line 67, for "alyl" read -- alkyl --.

Signed and sealed this 7th day of November 1967.

(SEAL)
Attest:

Edward M. Fletcher, Jr.                                        EDWARD J. BRENNER
Attesting Officer                                                    Commissioner of Patents